United States Patent [19]

Thompson et al.

[11] 4,126,262
[45] Nov. 21, 1978

[54] ALL-PLASTIC HEAT-SEALABLE CONTAINER MATERIAL AND METHOD OF MAKING

[75] Inventors: Kenneth P. Thompson, Canton, N.C.; Richard C. Ihde, Strongsville, Ohio; Clarence E. Roth, Orange, Tex.

[73] Assignee: Champion International Corporation, Stamford, Conn.

[21] Appl. No.: 702,018

[22] Filed: Jul. 2, 1976

[51] Int. Cl.² .......................... B65D 5/72; B32B 3/04
[52] U.S. Cl. ............................ 229/17 G; 428/36; 428/12; 428/57; 428/129; 428/215; 428/516; 264/173
[58] Field of Search ............. 428/36, 68, 76, 515–518, 428/12, 57, 126, 127, 128, 129, 212, 215, 218, 220; 229/48 T, 3.1, 17; 264/171, 173

[56] References Cited

U.S. PATENT DOCUMENTS

| | | | |
|---|---|---|---|
| 2,956,723 | 10/1960 | Tritsch | 229/48 T |
| 3,110,611 | 1/1963 | Powelson | 428/516 |
| 3,120,333 | 2/1964 | Seiple | 229/17 G |
| 3,162,349 | 12/1964 | Kelly | 229/17 G |
| 3,223,761 | 12/1965 | Raley | 264/95 |
| 3,389,849 | 6/1968 | Egleston | 229/17 |
| 3,589,976 | 6/1971 | Erb | 428/215 |
| 3,595,735 | 7/1971 | Tyrrell | 428/220 |
| 3,939,976 | 2/1976 | Mayworm | 229/48 T |
| 3,979,048 | 9/1976 | Stark et al. | 229/48 T |

*Primary Examiner*—William R. Dixon, Jr.
*Attorney, Agent, or Firm*—Wood, Herron & Evans

[57] ABSTRACT

The invention provides a dynamic system for heat-sealing an all-plastic material in a continuous process at high speed. The invention includes an all-plastic heat-sealable container material comprising a multiple-layer composite, in sheet form, including a core layer and at least one outer layer on one side thereof. The layers preferably comprise thermoplastic material, the core layer material having a higher softening point than the outer layer material. The composite sheet is conveyed through a converting, side-seaming or other apparatus at high speed, the system being tuned to dynamically heat the outer layers to a molten state for heat sealing, while the core does not soften but remains undistorted. The core is thus thermally insensitive to heat at speeds used in side-seaming the composite, and as such it supports and maintains the structure of the sealing outer layers on its exterior while they are in a molten condition.

11 Claims, 6 Drawing Figures

ALL-PLASTIC HEAT-SEALABLE CONTAINER MATERIAL AND METHOD OF MAKING

This invention relates to all-plastic materials and to systems for handling such all-plastic materials including methods for sealing or constructing them into useful objects such as containers.

In the container field, it has been common practice to use many forms of materials which are heat-sealed or glued and other wise converted on conventional equipment to form a container or carton. Such containers are those typically known in the trade as "folding boxes", containers, or cartons.

By way of example, one such carton is the gable-top milk carton and carton blanks therefor which are specifically disclosed in U.S. Pat. No. 3,120,333 as liquid-tight containers. Essentially, blanks used in the manufacture of such containers include a paperboard base, extrusion coated on both sides with a resin, such as polyethylene, to provide a moisture barrier and to provide means for sealing the carton.

In a typical carton converting operation, and once the resin-coated blanks are cut and scored, the resin on an outer surface of a glue flap and the resin on an inner surface of a carton panel is heated by direct flame application while the heated carton surfaces extend in guided but essentially unsupported (i.e., not compressed between two heating jaws) condition over the edges of a conveying belt. The carton panels are then folded over to form a flattened tube, the now molten tacky resin on the heated surfaces being pressed together at a downstream nip to form a liquid-tight side seam. The cartons, in a flattened tube form, are then shipped to users such as dairies where they are finally erected by further heat-sealing, filled, and finally sealed.

While these familiar milk cartons have been extensively used over the United States, they exhibit several troublesome problems. One particularly troublesome problem results from wetting of the paperboard component of the carton. Such wetting can take place in areas where the moisture barrier resin is insufficient or fails. Pinholing of the resin and film failure or creasing along fold lines are examples of undesired problem areas where wetting is likely to occur. More importantly, moisture is also "wicked", or drawn by capillary action, into the paperboard via the exposed paperboard at the edge of the glue flap which resides within the filled carton. Wetting of the paperboard substantially weakens the cartons, may cause them to lose shape or to leak, and can destroy their desired appearance. While certain innovations, such as that described in U.S. Pat. Nos. 3,482,278 and 3,927,245 have substantially improved paperboard cartons, the existence of paperboard in the carton renders the carton always subject to undesired paperboard wetting.

In one attempt to overcome this problem, it has been proposed to employ homogeneous, all-plastic liquid containers such as can be formed by a blow-molding operation. Once such containers are formed, they are typically shipped to a dairy for filling. By virtue of the fact these containers are completely formed, and the fact that their transportation thus includes transporting the air in them, shipping charges are substantially increased over shipping charges for similar volume containers which can be shipped in a flattened condition. This substantially limits the range over which the blow-molded containers can be shipped from the molding plant. Moreover, not only are such containers not readily adaptable to inexpensive printed decorations, as can be appreciated, but plastic distortion and container wall weaknesses result from the forming operations, rendering such containers even less desirable.

Another attempt to provide an all-plastic container is disclosed, for example, in U.S. Pat. Nos. 3,389,849 and 3,334,802. In these patents, an all-plastic carton blank of requisite stiffness is cut and scored in patterns similar to those of the resin-coated paperboard cartons disclosed in the other patents cited above. The patents disclose the forming of such all-plastic blanks into tubes by joining the side seam pursuant to such broad techniques as "heat, sound or light", but they do not teach how the specific heat-sealing technique of conventional resin-coated paperboard converting equipment can be used to side-seam such blanks, nor how sealing can be accomplished at high speed.

Unfortunately, the known sealing techniques broadly cited by the patents relating to these homogeneous plastic blanks do not provide speeds which are necessary for commercial production, i.e., on the order of 125,000 containers per hour. Moreover, when these homogeneous plastic containers are run through a typical resin-coated paperboard converter, the conventional technique of side-seaming by direct flame application to the unconfined container surfaces does not work. In order to render the plastic surface sufficiently molten to efficiently seal, so much heat must be applied to the plastic overall that it draws up and shrivels into an unusable mass.

Thus, while homogeneous all-plastic blanks could possibly be sealed by some known heat-sealing technique such as a static system wherein the heated areas are supported or confined, for example, between heating jaws, no such other known techniques is capable of high commercial production speed. Moreover, the use of other sealing techniques would require the converter to purchase other equipment to provide efficient sealing, the all-plastic container rendering his current equipment obsolete. Accordingly, such all-plastic containers have not been commercially accepted to any significant degree.

It has thus been one objective of the present invention to provide an all-plastic, flat container blank which can be converted to a heat-sealed, side-seamed, flattened tube form on conventional converting equipment at relatively high commercial production speeds.

It has been a further objective of the invention to provide an all-plastic stock material which can be heat-sealed by the controlled application of direct heat to unconfined and thus unsupported surfaces thereof without undesired deformation, distortion or degradation of the material as a whole.

A further objective of the invention has been to provide a method for manufacturing and forming, at high production speeds, an all-plastic, side-seamed tube from a flattened all-plastic blank form, on conventional resin-coated paperboard carton converting equipment, and from which containers can be manufactured.

A further objective of this invention has been to provide a dynamic system for heat-sealing all-plastic container material at higher production speed than has been heretofore commercially available.

To these ends, the present invention broadly includes a stock material of multiple layers wherein an outer layer of the multiple layer material can be rendered molten, in a dynamic system and when the material is unconfined, without distortion of the core area of material so that the core provides structural undistorted, unshrivelled support for the molten outer layer. In a preferred embodiment, the invention includes an all-plastic, multiple-layer container blank comprising a "spine", "backbone" or structural plastic core having a relatively high softening point, and on each side of the core layer, an outer plastic layer, having a lower softening point. The material of the layers is selected so that when the blanks are fed through conventional converting equipment at predetermined speed, direct flame application to unconfined portions of the blanks raises the temperature of the outer layer to render it suitably molten for heat-sealing, yet the core is not significantly thermally affected and provides structural rigidity and support, without distortion, for the softened and molten outer layers.

Accordingly, the core is preferably made, in one embodiment, from a high density polyethylene material while the outer layers are made from a lower density polyethylene material. The thickness of the outer layers is selected so that suitable heat is retained to keep them sufficiently molten until such time as one surface is pressed against another to form a heat-sealed side seam.

To insure integrity of the multi-layered composite, it is formed by a co-extruding process wherein the different core and outer layers are first joined in molten condition prior to simultaneous extrusion through a common die orifice. The inter-layer bond is thereby enhanced, in turn contributing to the integrity of the container's side seam and its top and bottom heat-sealed structures.

Thus, in one form of the invention, similar polymers for the core and outer layers are used, the core layer polymers comprising a higher density than the lower density outer layers. The softening point temperature differential between the two is maintained at a value which permits side-seaming by direct heat application in a dynamic system, as in conventional resin-coated paperboard converting equipment, to unconfined container portions but without deformation of the core.

The invention, including both the material and the dynamic method in which it is handled, is highly useful in a number of applications, such as in forming folding boxes, containers, cartons, liquid-tight containers and other objects in which the utilization of all-plastic materials having sealing capabilities are desired.

In another aspect of the invention, where similar or compatible polymers for core and outer layers are used, trim waste or scrap from the co-extruded stock material is added to the plastic supply for subsequent core or outer layers in a ratio that will maintain the above mentioned temperature differential which will permit heat-sealing of the material in conventional converting systems. Also, complete container recyclability is provided by adjusting the softening points of portions of the melt, comprising previous containers, and extruding it with other portions having a different softening point. This enhances economy of operation and reduces waste, as compared to a resin-coated paperboard operation where difficulties are encountered in economically removing the resin and without damaging the paperboard substrate.

These and other features and advantages of the invention will become readily apparent from the following detailed description and drawings in which.

DETAILED DESCRIPTION OF THE INVENTION

Figure 1:
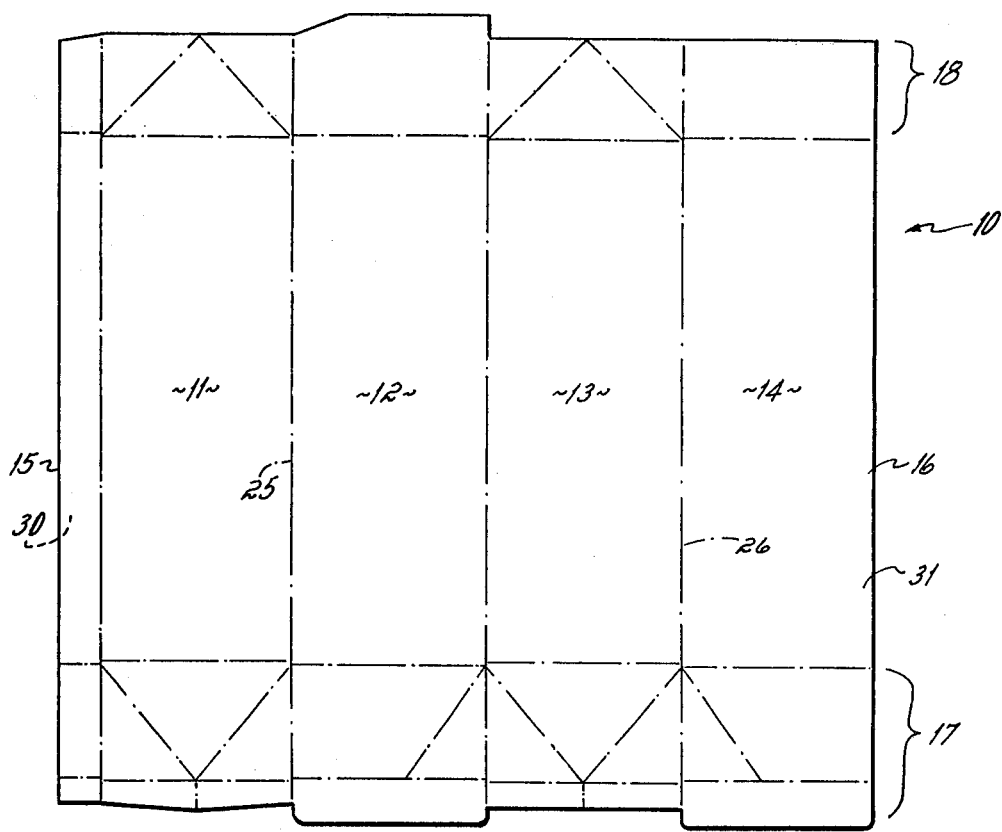
FIG. 1 is a view of a multiple-layer container blank in accordance with the invention.

The invention described herein is particularly useful for manufacturing, for example, containers of many various types. Such containers, for example, may comprise folding boxes, square or rectangular containers or cartons, or simple cylindrical tubes having a bottom closure means and generally also a top closure means.

For example only, one particular form of container configuration with which the invention herein is highly useful is the gable-top liquid food carton described in the patents listed hereinabove. Accordingly, and more fully to describe a preferred aspect of the present invention, the disclosures of each of the above patents are incorporated by reference as if they were set forth herein at length.

Of course, the multiple-layer composite described herein has many other uses, as will be appreciated, and such as, for example, in the packaging of other foods and other materials where moisture, grease, petroleum, and the like are present and the packaging material must provide barriers to these elements.

Turning now to a detailed description of the invention, we have discovered that it is now possible to dynamically side-seam an all-plastic material to form a tube, from which containers can be made, by heat-sealing the material via the direct predetermined, timed application of heat to unconfined relatively free-standing portions of said material, without material distortion or shrivelling, and by thereafter pressing tacky portions of said material together, all at high production speeds. Moreover, and for example, we have found that all-plastic liquid-tight containers, according to our invention, can be heat-sealed at high speed on conventional resin-coated paperboard carton converting equipment.

The invention contemplates a multiple-layer or "composite" material including a spine, backbone or core layer of thermoplastic polymer, which is essentially responsible for the structural rigidity of the present containers, and one or more outer layers which provide dynamic heat-sealability at high commercial production speeds, the relationship of the physical characteristics of the core layer to those of the outer layers being critical as defined herein. The particular composition of each respective layer is not in and of itself critical, but the relationship of certain physical characteristics of each layer to the other is critical.

In order to supply the various objectives of this invention, we have provided, in a preferred embodiment, a container material as above, where the physical characteristics of the core layer and the outer layers exhibit a differential in softening point temperature. Thus, the core and outer layer thermoplastic materials are selected so that the softening point of the core material is higher than that of the outer layer material.

Further, the core layer material and outer layer material are selected such that the outer container portions can be rendered sufficiently molten, by the direct, timed application of heat, without distortion of the core layer which provides non-deforming structural support for the tacky outer layers. In this manner, not only can the impenetrability of the container be insured, but additionally, the all-plastic container blank material can be simply and easily sealed, through dynamic application of heat to unconfined container portions without distortion or shrivelling of the container blank as a whole. Thus, the invention contemplates a dynamic system wherein a predetermined quantum of heat is applied to a specified material of the above characteristics to achieve efficient heat-sealing at high speed.

Of course, the invention is not limited to any particular manner of heat application, it only being necessary that a sufficient amount of heat be applied to soften and render the outer surfaces molten while leaving the core substantially unaffected. Accordingly, reference is made herein to a "dynamic" application of heat which defines the application of predetermined heat to the material during a controlled time period. As will be seen, conveying the material through or past an open flame at a predetermined speed is one method of dynamically heating the material so the described results are obtained.

In a preferred embodiment, a relatively high density polyethylene is selected as the core material while the same or similar polymer, but of significantly lower density, is selected as the outer layer material. The differential in softening point temperature of the two materials is such that the outer layer or layers can be dynamically heated to sufficiently molten condition for efficient heat-sealing without distortion or shrivelling of the core as stated above.

Selection of the materials in this manner permits conversion of the all-plastic container provided herein on conventional converting equipment now in use for heat-sealing resin-coated paperboard blanks to form tubes therefrom for later erection, filling and sealing in carton form. Moreover, relatively high production speeds on the order of 125,000 per hour are fully attainable.

As hereinafter described, the direct dynamic application of heat to unconfined container portions, in a conventional manner, rendered the outer surface molten, but did not distort or deform the core material of the present invention. The application of this same sealing technique to homogeneous plastic containers failed, the plastic deforming and shrivelling into an unusable mass.

While the invention in its preferred embodiment contemplates a composite including a core layer and an outer layer on each side thereof, it should be appreciated that a composite including a core or support layer and a single outer layer on one side thereof has utility for some applications such as for example, in forming a heat-sealed pouch-type container.

The core layer contemplated by the invention may be composed of any thermoplastic polymer material in accordance with the invention. It is ordinarily preferred, however, that it be of high density, exhibiting for example, a specific gravity of from about 0.95 to about 0.965, and more preferably a density exhibiting a specific gravity of about 0.955 to 0.960 or above, this density range insuring desirable moisture and vapor barrier characteristics for the container.

For structural rigidity, the thickness of the composite blank in a liquid food container application is approximately the same as that of a resin-coated paperboard container. Thus, the total thickness may be in the approximate range of from 15 mils to about 25 mils, although this thickness may vary outside this range depending on specific application. Thickness of the core layer may thus be in the approximate range of from about 13.5 mils to about 23.5 mils, depending on application and, of course, on the physical characteristics of the particular material selected. This insures a desirable rigidity and strength in the product container. Most preferably, for use in a liquid food container, core layer thickness is approximately from about 15 mils to about 17.5 mils.

Suitable examples of the preferred core layer material are the thermoplastic resins such as polyolefin, polyvinyl chloride, polystyrene, polyvinyl acetate and copolymers thereof and the like. Most preferred are polyethylene, polypropylene, and copolymers thereof. They are well-known in the art as exhibiting optimal packaging characteristics.

The outer layers which are fused to either side of the core layer are primarily responsible for the heat-seal characteristics of the container material. In contrast to the polymer of the core layer, which remains essentially inert during the production of the present containers, the outer layers must be capable of softening to a molten condition sufficient for fusing where a seal is desired; and at a temperature less than that which would tend to distort or shrivel the core when heated while unconfined.

Of course, at ambient temperatures, such as those ordinarily encountered incident to use, the outer plies remain hard and fluid-impenetrable. Thus, they further contribute to the desirability of the container as a whole.

The outer layers may generally be composed of any of the polymeric materials already described with respect to the core ply material and in accord with the disclosure herein. Preferably, the outer layers should be susceptible to printing and thus in one embodiment comprise polyethylene which insures use of direct printing without the need for the application of an independent label.

In a preferred embodiment, density of the outer layers is lower than that of the core. Generally, a low density thermoplastic material, such as polyethylene, exhibiting a specific gravity in the approximate range of from about 0.918 to about 0.930 is chosen. Most preferable are such materials exhibiting a specific gravity of from about 0.922 to about 0.925. A thermoplastic material exhibiting a specific gravity of about 0.9245 has been found particularly useful.

The thicknesses of the outer layers are, like those of the core layer, susceptible to wide variation depending on application. In a useful application of the invention for liquid food containers, the outer layers may have a thickness in the approximate range of from about 5% to about 15% of the thickness of the core layer, and preferably about 10% of the core thickness. Of course, the outer layer's thickness may be outside this range depending on application and on production apparatus for producing the layers and for treating the composite material. For example, very thin outer layers (less than 5% of core thickness) could be utilized if they could be heated and then sealingly joined very quickly.

Preferably, however, in liquid food containers, these outer layers are of a thickness of from about 0.50 mils to about 2.5 mils and most preferably from about 0.75 mils to about 2.0 mils. Such a thickness, where the core layer is about 15 to 17.5 mils, provides proper heat-sealability of the outer layers, while avoiding excess thickness in these layers, and permitting the core to provide the necessary structural rigidity.

Selection of the outer layer's thickness is also important to efficient heat-sealing of the material. For example, in conventional converting equipment heat is applied at one station while the compression nip, for pressing heated molten portions together, is spaced at another downstream station. The heated plastic of the container materials tends to retain heat, and thus desired fluidity, in relationship to the volume of heated plastic. Thus, the plastic thickness must be such that it remains sufficiently molten, after heating, until it is joined with a corresponding molten surface. Too little plastic thus may not retain sufficient heat for effective sealing.

While various known techniques may be used to form the multiple-layer composite of core and outer layers described herein, it is preferable to produce them by the known technique of co-extrusion in order to prevent layer separation. Lamination techniques, where the layers are joined subsequent to extrusion may not provide adequate layer adhesion or fusion.

In a preferred technique, the materials of the core and outer layers are simultaneously extruded through a common die orifice, having been joined in molten form prior to extrusion. This technique provides improved layer integrity, positively fusing them together, and enhances the integrity of the side seam seal and the seal at the container's top and bottom structure.

In addition to the thermoplastic polymers of which the present layers are composed, various additional elements may be included as constituents of one or more of the layers in order further to improve the present containers. Thus, for example, one or more layers may be provided with a pigment such as titanium dioxide. Such a pigment, which is normally dispersed throughout one or more layers, enhances the appearance of the present containers.

In addition, however, pigments may be utilized in order to provide protection for the eventual container contents. Thus, for example, where light may adversely affect the eventual contents of a container, appropriate dispersion of pigments in, or on, one or more layers may be utilized to render the container opaque. This increases the storage stability for the contained liquid.

After manufacture of the co-extruded stock material, which is normally collected in rolls, the manufacture of the present containers proceeds. The multiple-layer material is unrolled and stored and cut into appropriate configuration for forming the container. In this connection, we have found it advantageous to cut and score the plastic material in accordance with U.S. Pat. Nos. 3,594,464 and 3,768,950, to avoid distortion on the side wall panels of the container blank. Preferably, the material is cut into blanks and scored in the score line pattern shown in FIG. 1.

An exemplary blank 10 includes side wall panels 11–14, a glue flap 15, extending from side panel 11, and a side portion or edge 16 (opposite side) of panel 14 to which the glue flap will be heat-sealed. The blank further comprises a top forming structure 17, formed by the cut and scored top panels extending from the side panels as shown, and a bottom forming structure 18 formed by the cut and scored bottom panels extending from the side panels as shown. In addition to other score lines, the blank includes score lines 25 and 26 about which the blank is folded, after heating, to form a flattened tube.

Figures 3, 4:
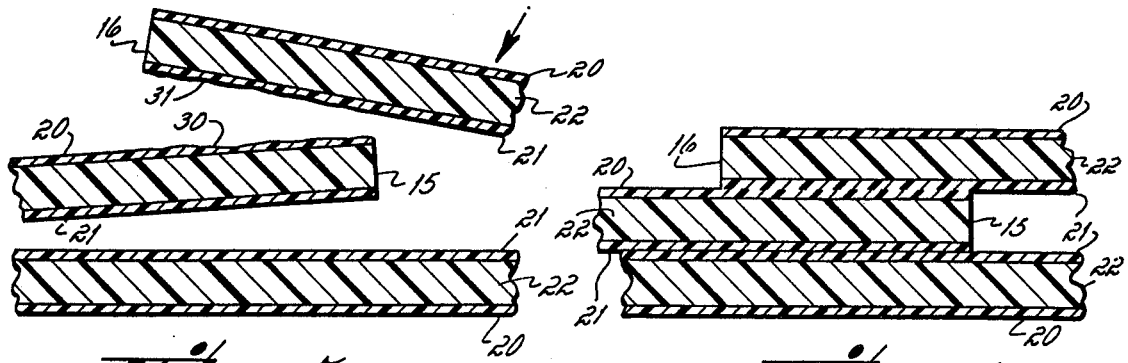
FIG. 3 is an enlarged cross-sectional view of the circled area of the blanks of FIG. 2.
FIG. 4 is an enlarged cross-sectional view of a sealed blank in flattened tube form and in the area corresponding to that shown in FIG. 3.

As shown in FIGS. 3 and 4, the blank is a multiple-layer composite preferably of three layers including respective outer layers 20 and 21 and a core layer 22. As stated above, the materials are preferably thermoplastic polymers, the core being of higher density than the outer layer polymers, and having a softening point temperature greater than that of the outer layer polymer so that the outer layers can be heated, when unconfined, to a softened molten condition suitable for heat-sealing without distortion or shrivelling of the core.

After cutting and scoring, the blanks are converted into flattened tube form, on conventional resin-coated paperboard converting equipment, by heat-sealing a side seam therein so that significantly, no adhesives, staples or other agents are required to retain the seam. After converting, the containers are shipped to a dairy, for example, or other user where they are erected, filled and sealed.

Figure 5:
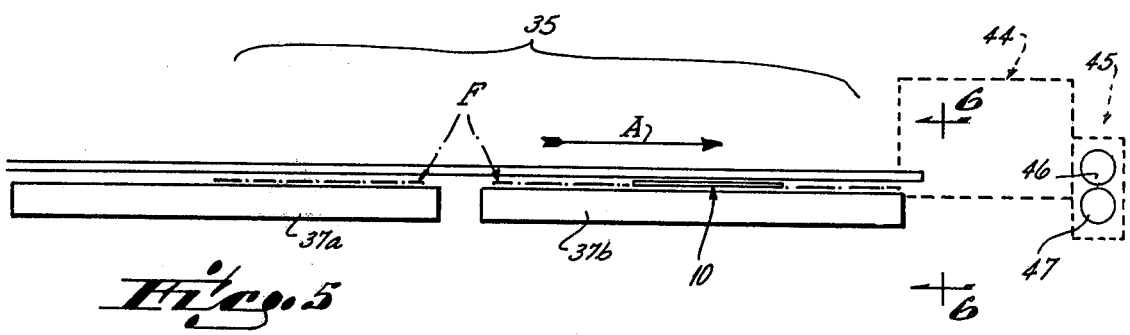
FIG. 5 is a diagrammatic elevational view of the converting apparatus.
Figure 6:
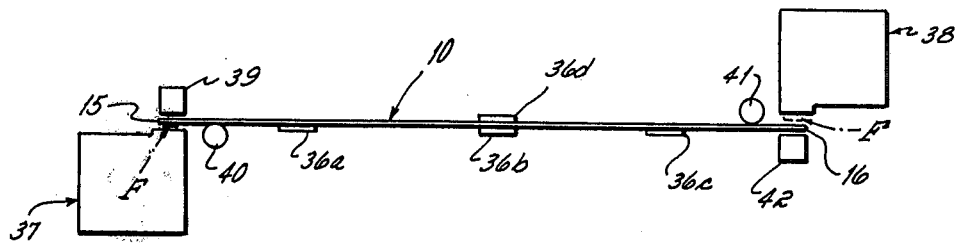
FIG. 6 is an end view taken along lines 6—6 of FIG. 5.

In the converting state, FIGS. 5 and 6 depict a conventional heat-seal, side-seamer apparatus wherein a plastic multiple-layer blank 10, in laid-out flat form, is conveyed past a heating station 35. A conveyor comprising, for example, belts 36a, 36b, 36c and 36d, carries successive blanks 10, in the machine direction indicated by Arrow A, such that the edge portion 16 and glue flap 15 of each are in an unconfined condition. The conveyor is driven at a line speed of about 1800 feet per minute.

At the heating station, a pair of burner lines comprising elongated burners 37 and 38 are aligned adjacent the conveyor to direct a flame F at approximately 1700° F. against an elongated area 30 extending along the glue flap 15 from carton top structure to carton bottom structure and an elongated area 31 extending along the side wall edge portion 16 from carton top structure to carton bottom structure. Each line of burners is, in total, approximately 48 inches long and has numerous gas outlets sufficient to provide a nearly continuous flame along the burner's length. Each burner line may comprise two or more burners as shown, for example, at 37a and 37b. The burners are oriented to heat the appropriate sides of the blank as shown.

At the heating station, water cooled bars 39–42 provide guides for the blank as it passes the burner. In this respect, the blanks may contact the bars, opposite the burners, but the bars only guide and do not provide confining structural support for the blank as would keep it from shrivelling. Thus, in the context of this application, the term "unconfined" is defined to mean without confinement or engagement on both sides of the sealing area, as in one conventional heat-sealing operation wherein heated members engage and confine, in supporting relationship, the material to be sealed.

Application of the heat to the moving outer plastic layers 20 and 21 in the respective areas 30 and 31 on the glue flap 15 and edge portion 16 is sufficient to render them sufficiently molten for efficient heat-sealing, yet the core is not softened to such an extent that it would distort or shrivel. Thus, although the outer layers are heated to become sufficiently molten throughout a flat sealing area, the core layer is so thermally insensitive to the heat for the duration of time therein that the core provides undistorted structural support for the molten outer layers, even though the edges of the blank are not structurally confined.

After application of heat, the blank is folded at a folding station 44 about score lines 25 and 26 and the glue flap 15 and edge portion 16 are sealingly joined at a downstream nip 45. The nip comprises rollers 46 and 47, and is spaced about 6 or 7 feet from the end of the burner line.

Figure 2:
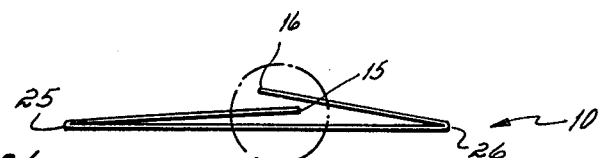
FIG. 2 is a diagrammatic end view showing the blank of FIG. 1 in partially folded condition after heating.

Configuration of the partially folded blank is shown in cross-section in FIG. 2, and in more detail at the side seam area of FIG. 3. In FIG. 3, the outer layers 20 and 21 have been softened and rendered molten in the elongated areas designated at 31 and 30 respectively. As shown, the core layers provide structural support for the outer layers, remaining undistorted and unshrivelled.

FIG. 4 discloses a detailed cross-section of the side-seamed flattened tube in the same area depicted in FIG. 3, but with the seal completed. As shown, the molten outer layers, in the areas 30 and 31, have fused to form a liquid-tight side seam between the glue flap 15 and edge portion 16 of side wall panel 14.

The tubes thus formed, and after sealing, are then typically transported to a user such as a packaging facility or a dairy, for example, where they are erected, bottom sealed, filled, and top sealed. Both bottom and top sealing can include the dynamic application of heat to appropriate unconfined surfaces of sealing panels to render the outer layer or layers sufficiently molten to provide a liquid-tight seal, all without distorting or shrivelling of the core layer.

Although apart from the softening point differentials specified above it is not always necessary that the thermoplastic polymer of the core or of either of the outer layers be selected having regard to the types of polymer of any other layer, it is often desirable to pick at least highly compatible polymers if the same polymer (differing in density only) is not used. Substantial advantages can be obtained where, for example, the present containers are to be recycled.

Both outer layers of the present composite are therefore preferably composed of the same polymer. Further, in certain recycling techniques, it is still more advantageous if all layers are composed of the same type of polymer.

In this regard, and in a preferred recycling operation, any scrap or trim waste produced incident to manufacture of stock material or blanks can be readily recycled by adding it to the plastic supply for either core or outer layer in such a ratio as will not reduce the minimum softening point differential desired between the core layer and the outer layers. Where such scrap or waste is to be recycled, the respective layer materials can be originally selected to permit the addition of scrap or waste in the ratio, for example, of one part scrap or waste, to nine parts of original core plastic without adversely affecting the minimum required parameter between the softening points of the two layer materials.

A further significant advantage of this invention lies in the complete recyclability of the present containers. Obviously, the ability to reclaim all constituents of a container material presents an economic advantage. Thus, the present container material is susceptible to simplified and inexpensive recycling techniques which further increase its desirability.

More particularly, while recycling may be accomplished by a number of readily apparent techniques, we provide a particularly effective process wherein the entire thermoplastic material can be utilized for the production of further containers or any of the myriad products of which such a material is commonly composed.

While a molten mass of the composite material will exhibit a softening point intermediate that of the initial core and outer layers, the material is still capable of recycling into new container material. Thus, the molten admixture may be utilized for formation of either a core layer or one or more outer layers of a new composite material. All that is required is that the thermoplastic polymer of other layer or layers be selected having regard to the already discussed softening point differentials required for such layers.

A further technique for reducing the amounts of additional materials necessary for the formation of multiple-layer composites includes separating the molten admixture, formed from the initial container composite material, into at least two like portions. One or more of such portions may then be adjusted, through addition of an agent which will alter its softening point. For example, a polymer of very high softening point may be added to one of the two portions so as to increase its softening point, with respect to the other portion, by at least the required number of degrees to be useful, in accordance with this invention, as a core layer for a lower softening point predetermined outer layer material. Thereafter, the portion with higher softening point may be formed into a core layer while the remaining portion or portions are applied thereto as outer layers by co-extrusion.

Conversely, an agent such as a relatively low softening point polymer can be added to one or more of the portions. In this instance, it is the portion not containing the additive which is utilized for forming the core layer of the recycle composite.

The following specific examples will serve further to illustrate the practice and advantages of the present invention.

EXAMPLES

A composite multilayer sheet was prepared by co-extrusion, each sheet comprising a core layer, of relatively high density polyethylene, and outer layers, of relatively lower density polyethylene, on each side of the core layer. Various sheets were formed according to the following specific examples.

|    |              | Material | Approx. Density gms./ml. | Approx. Softening point | Thickness |      |
|----|--------------|----------|--------------------------|--------------------------|-----------|------|
| #1 | Core         | PE 9420  | .955                     | 129°C                    | 15.0      | mils |
|    | Outer Layers | PE 4524  | .9245                    | 110° C                   | 1.0       | mil  |
| #2 | Core         | PE 9420  | .955                     | 129° C                   | 15.5      | mils |
|    | Outer Layers | PE 5554H | .9245                    | 110° C                   | .75       | mil  |
| #3 | Core         | PE 9420  | .955                     | 129° C                   | 15.0      | mils |
|    | Outer Layers | PE 5554H | .9245                    | 110° C                   | 1.0       | mil  |
| #4 | Core         | PE 9420  | .955                     | 129° C                   | 17.5      | mils |
|    | Outer Layers | PE 5554H | .9245                    | 110° C                   | .75       | mil  |

Softening points of the specific polymer materials set out in the above samples are only approximate. The temperatures are exemplary only, and have been included herein on the basis of information provided by Gulf Oil Chemicals Company, U.S. Operations, Plastics Division, Orange Technical Laboratory. The softening points were determined according to Standard Tests Nos. 201 and 202 of the same Laboratory.

On the basis of this information and these specific tests, the temperature differential between the high density core and the lower density surface is about 20° C. As stated herein, the exact softening points are not critical, but the softening points exhibited by the polymers of type and density as noted are sufficient to permit rendering the outer layers molten, on conventional thermoplastic coated paperboard carton converting apparatus as will now be set out, while the core remains significantly unaffected thermally so as to provide sole structural support for the outer layers.

A tube was formed from these sheets by side-seaming on conventional resin-coated paperboard converting apparatus as described herein, the unconfined moving container portions being heated so the outer layers became sufficiently molten to provide an efficient heat-seal. Line speed was approximately 1800 feet per minute and burner flame temperature about 1700° F.

Despite this dynamic heating step, the core layers did not exhibit any sign of distortion or shrivelling and provided structural support for the molten outer layers. Moreover, the seal formed by the fused outer plies was continuous and liquid-tight.

Strengths of the sealed side seam were tested, as was the side seam of a conventional resin-coated paperboard control container sealed on conventional converting equipment. Both seal strength (tensile pull along seal) and heat-seal strength (seal shear) were found to be comparable, and in some examples, superior to the strength exhibited by the control carton.

Accordingly, and in one form, the invention provides an all-plastic container material capable of being side-seamed into a flattened tube form at high speeds on conventional resin-coated paperboard carton blank converting equipment, thereby rendering the all-plastic carton commercially practicable for liquid-tight as well as other containers.

These and other advantages, modifications and equivalents will become readily apparent from this disclosure, to those of ordinary skill in the art, without departing from the scope of this invention, and applicants intend to be bound only by the appended claims.

We claim:

1. A multiple-layer composite blank product in flattened tube form from which containers can be made, said blank comprising a core layer of high density thermoplastic polymeric material having a specific gravity of about 0.950 to about 0.965, a thickness of 15 mils to about 17.5 mils, and a first predetermined softening point, and an outer layer of lower density thermoplastic polymeric material on each side of said core layer, said outer layers having a specific gravity of about 0.918 to about 0.930, a thickness of about 0.75 mils to about 2.0 mils, and a second predetermined softening point lower than said first predetermined softening point such that said outer layers, at unconfined edge portions of said blank, can be dynamically heated to sufficient molten condition for heat sealing while said core layer is not significantly thermally affected and provides structural support for said outer layer without distortion or shrivelling, said blank product being formed by the process of joining the polymeric materials while in molten condition and co-extruding them, and said flattened tube form having a heat-sealed side-seam and being formed by the process of dynamically heating said outer layers at unconfined edge portions of said blank to sufficient molten condition for heat-sealing, and thereafter joining edge portions of said blank together to form said side-seam in predetermined areas wherein said outer layers are molten, said core layer providing, during and after said dynamic heating, the sole structural support for said unconfined molten outer layers.

2. A multiple-layer stock material as in claim 1 wherein said core layer is a relatively higher density polyethylene and said outer layers are a relatively lower density polyethylene.

3. A sheet as in claim 1 and in blank form having a heat-sealable bottom structure including a plurality of scored and foldable bottom panels, a heat-sealable gable-top structure including a plurality of scored and foldable gable-top panels, and a heat-sealed side seam.

4. A sheet as in claim 1 wherein the core layer comprises one or more polymers selected from the group consisting of polyethylene, polypropylene, polyvinyl chloride, polyvinyl acetate and polystyrene.

5. A sheet as in claim 1 wherein each of said outer layers comprise one or more polymers selected from the group consisting of polyethylene, polypropylene, polyvinyl chloride, polyvinyl acetate and polystyrene.

6. A sheet as in claim 1 wherein the core and outer layers are composed of one or more polymers selected from the group consisting of polyethylene, polypropylene, polyvinyl chloride, polyvinyl acetate and polystyrene.

7. A sheet as in claim 1 wherein the two outer layers are substantially identical in composition and properties.

8. A sheet as in claim 1 wherein said layers are comprised of thermoplastic material, the thermoplastic material of the outer layers having a softening point of about 110° C.

9. A sheet as in claim 1 wherein the thermoplastic material of the core layer has a softening point of about 129° C.

10. A blank as in claim 1 wherein the differential between said first and second softening points is about 20° C.

11. A blank as in claim 1 wherein said first softening point is about 129° C. and said second softening point is about 110° C.

* * * * *

UNITED STATES PATENT AND TRADEMARK OFFICE
CERTIFICATE OF CORRECTION

PATENT NO. : 4,126,262

DATED : November 21, 1978

INVENTOR(S) : Kenneth P. Thompson, Richard C. Ihde and Clarence E. Roth

It is certified that error appears in the above-identified patent and that said Letters Patent are hereby corrected as shown below:

Column 7, line 51, "stored" should be --scored--

Column 10, in the Table, the first three headings are incorrect and should be corrected as follows:

"Approx. Density Material" should be --Material--

"Approx. Softening gms./ml." should be --Approx. Density gms./ml.--

"point" should be --Approx. Softening Point--

Signed and Sealed this

Twenty-second Day of May 1979

[SEAL]

Attest:

RUTH C. MASON
Attesting Officer

DONALD W. BANNER
Commissioner of Patents and Trademarks